United States Patent
Yamazaki et al.

(10) Patent No.: US 8,683,887 B2
(45) Date of Patent: Apr. 1, 2014

(54) RACK-AND-PINION STEERING APPARATUS

(75) Inventors: Takayasu Yamazaki, Kyoto (JP); Shirou Nakano, Osaka (JP)

(73) Assignee: JTEKT Corporation, Osaka-Shi (JP)

( * ) Notice: Subject to any disclaimer, the term of this patent is extended or adjusted under 35 U.S.C. 154(b) by 1885 days.

(21) Appl. No.: 10/585,759

(22) PCT Filed: Jan. 12, 2005

(86) PCT No.: PCT/JP2005/000251
§ 371 (c)(1),
(2), (4) Date: Jul. 12, 2006

(87) PCT Pub. No.: WO2005/068878
PCT Pub. Date: Jul. 28, 2005

(65) Prior Publication Data
US 2008/0223163 A1 Sep. 18, 2008

(30) Foreign Application Priority Data
Jan. 13, 2004 (JP) .................................. 2004-006094

(51) Int. Cl.
*F16H 55/08* (2006.01)
(52) U.S. Cl.
USPC ............ 74/462; 74/422; 74/388 PS; 74/89.11
(58) Field of Classification Search
USPC .................... 74/89.11, 388 PS, 422, 457, 462
See application file for complete search history.

(56) References Cited

U.S. PATENT DOCUMENTS

| 4,382,389 | A | | 5/1983 | Namiki et al. |
| 6,023,989 | A | * | 2/2000 | Imase et al. ..................... 74/422 |
| 6,080,199 | A | * | 6/2000 | Umeyama et al. ................ 703/1 |
| 6,834,742 | B2 | * | 12/2004 | Nakatsu et al. ............... 180/444 |

FOREIGN PATENT DOCUMENTS

| JP | 51-82851 A | 7/1976 |
| JP | 56-31551 A | 3/1981 |
| JP | 57-116574 U | 7/1982 |
| JP | 62-38579 B2 | 8/1987 |
| JP | 63-180766 A | 7/1988 |
| JP | 6-280970 A | 10/1994 |
| JP | 9-133187 A | 5/1997 |
| JP | 2000-130560 A | 5/2000 |
| JP | 2000-211535 A | 8/2000 |
| JP | 2001-163228 A | 6/2001 |
| JP | 2004-001679 A | 1/2004 |
| JP | 2005-016646 A | 1/2005 |
| WO | WO-2005/056367 A1 | 6/2005 |
| WO | WO-2005/068878 A1 | 7/2005 |

* cited by examiner

*Primary Examiner* — David M Fenstermacher
*Assistant Examiner* — Terence Boes
(74) *Attorney, Agent, or Firm* — Birch, Stewart, Kolasch & Birch, LLP

(57) ABSTRACT

A rack-and-pinion steering apparatus comprises pinion teeth formed according to proper tooth specifications in other aspects under a larger pressure angle, thereby stably offering smooth and comfortable steering feeling over a long time. The module (m), number of teeth (z), tooth depth (h) and helix angle (β) of the pinion teeth (4) are set within the following ranges, under a pressure angle (α) set within a range of 24° to 30° and a given stroke ratio.

module (m): 1.8 to 2.0
number of teeth (z): 7 to 13
tooth depth (h): 2 m to 2.5 m
helix angle (β): 35° or smaller

5 Claims, 7 Drawing Sheets

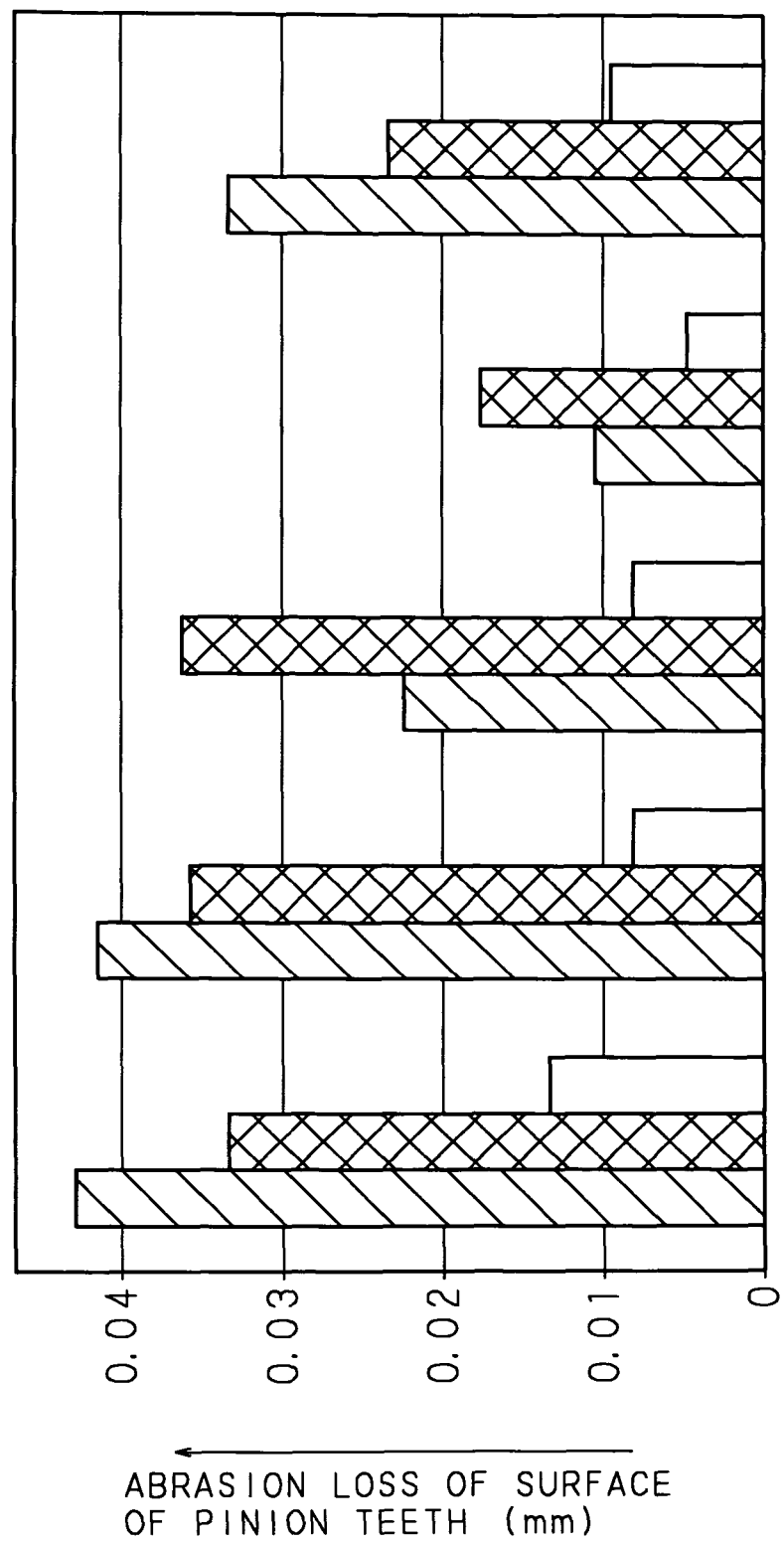

RACK-AND-PINION STEERING APPARATUS

This application is the national phase under 35 U.S.C. §371 of PCT International Application No. PCT/JP2005/000251 which has an International filing date of Jan. 12, 2005 and designated the United States of America.

TECHNICAL FIELD

The present invention relates to a rack-and-pinion steering apparatus, popularly employed as a type of steering apparatus for an automobile.

BACKGROUND ART

The rack-and-pinion steering apparatus popularly employed for an automobile is provided with a pinion shaft having pinion teeth provided on a circumferential surface thereof connected to a steering member such as a steering wheel, and a rack shaft having rack teeth provided over an appropriate length in a middle region of an outer surface thereof and disposed so as to extend in a left and right direction of the vehicle body, and converts the rotation of the pinion shaft according to operation of the steering member by the driver into an axial movement of the rack shaft, thus to steer the wheels for steering (generally, left and right front wheels) connected to the left and right ends of the rack shaft via respective tie rods.

Regarding such rack-and-pinion steering apparatus, various proposals have been made on tooth specifications (pressure angle, module, number of teeth and so on) of the pinion teeth and the rack teeth (for example, refer to Japanese Examined Patent Application Laid-Open No. 62-38579 (1987)), for the purpose of maintaining a proper meshing state between the pinion teeth provided on the pinion shaft and the rack teeth provided on the rack shaft, to thereby offer a comfortable steering feeling to the driver.

For such rack-and-pinion steering apparatus, the tooth specifications on the pinion teeth provided on the pinion shaft are selected so as to satisfy design conditions provided by the vehicle on which the steering apparatus is to be mounted, more specifically to secure a strength that bears a load condition required on an arc of a length delimited by a travel amount of the rack shaft per rotation of the pinion shaft, i.e. a stroke ratio.

Here, the pressure angle included in the tooth specifications is, in most cases, determined according to the standard value (20° or 14.5°) stipulated by JIS (Japanese Industrial Standard) and, upon applying such standard pressure angle, other tooth specifications such as the module and the number of teeth, selected under an ordinary stroke ratio in a vehicle (35 to 60 mm/rev.), are determined as around 2.5 and 5, respectively.

In the rack-and-pinion steering apparatus, however, a special meshing form is employed, such as incorporating pressurizing means that utilizes a spring load for biasing the rack shaft with pressure toward the pinion shaft so as to mesh the pinion teeth and the rack teeth without backlash, in order to reduce rattling noise produced at the mesh portion between the pinion teeth and the rack teeth, thus preventing degradation of steering feeling.

When the tooth specifications for such pinion teeth are selected under the standard pressure angle, the pinion teeth are so deeply meshed because of the pressurization by the pressurizing means, the meshing friction with the rack teeth is increased, which restrains propagation of a reaction force from the road surface to the driver operating the steering member connected to the pinion shaft, thus resulting in degradation of the steering feeling, which leads to a drawback that it becomes difficult to execute micro adjustment of the steering operation when driving at a high speed on a low-μ road that provides only a small reaction force from the road surface and, therefore, to a disadvantage that the pressurizing load of the pressurizing means has to be strictly controlled.

Besides, the selected number of the pinion teeth is as few as 5 pieces, and therefore when such pinion teeth are meshed with the rack teeth, a phenomenon that the tip portion of a rack tooth that has passed the normal meshing position interferes with the dedendum of a pinion tooth as if gouging out the same, i.e. what is known as trochoid interference takes place, which further increases the meshing friction between the pinion teeth and rack teeth, thereby worsening the foregoing disadvantage. Moreover, when the trochoid interference severely takes place, the wall thickness of the dedendum of the pinion teeth is reduced over time by the friction with the tip portion of the rack teeth, which leads to degradation in strength of the pinion teeth, and even to premature breakdown before a desired life span is completed.

Further, in a column-assist type power steering apparatus provided with a motor for steering assistance located halfway of a column shaft connecting the steering member and the pinion shaft, for transmitting the rotational force of the motor to the pinion shaft via the column shaft thus to assist the steering operation, the pinion teeth provided on the pinion shaft are subjected to the rotating torque of the motor, in addition to the steering torque applied to the steering member by the driver. Therefore, the pinion teeth are more likely to breakdown, and besides the response of the rack shaft, upon transmitting thereto the rotation of the motor via the pinion shaft, becomes less perceptible, thus resulting in degradation in steering feeling.

Japanese Examined Patent Application Laid-Open No. 62-38579 (1987) only discloses a method of selecting a helix angle and a pressure angle of the rack teeth based on a relation with the cross-sectional shape of the rack shaft, for the purpose of preventing seizure between the pinion teeth and the rack teeth formed as skewed teeth, which occurs at the mesh portion therebetween because of the rotational displacement of the rack shaft around its axis, and hence does not provide any measures to solve the foregoing problems originating from the meshing friction and the trochoid interference.

Further, for preventing occurrence of the trochoid interference, conventionally the pinion teeth, as well as the rack teeth that mesh therewith, are formed as a "low tooth" having a tooth depth smaller than 1 module on an addendum side, compared with a pitch circle, to thereby secure a predetermined clearance. In this case, however, it becomes difficult to achieve a transverse contact ratio of 1 or greater between the rack teeth and the pinion teeth, and hence the meshing becomes discontinuous, thus creating another drawback that smooth movement of the rack shaft for the steering operation is disturbed.

DISCLOSURE OF THE INVENTION

The present invention has been conceived in view of the foregoing situation, with an object to provide a rack-and-pinion steering apparatus including pinion teeth having a larger pressure angle for reducing meshing friction with rack teeth, and formed according to proper tooth specifications in other aspects under such pressure angle, thereby stably offering smooth and comfortable steering feeling over a long time.

A rack-and-pinion steering apparatus according to a first aspect of the present invention is a rack-and-pinion steering apparatus including pinion teeth provided on a circumferential surface of a pinion shaft and rack teeth provided on an outer surface of a rack shaft, meshed with each other without backlash, so as to transmit rotation of the pinion shaft connected to a steering member to the rack shaft via a mesh portion between the pinion teeth and the rack teeth, thus to move the rack shaft in an axial direction thereof at a predetermined stroke ratio for execution of steering operation, characterized in that the pinion teeth are provided with a pressure angle $\alpha$ set within a range of 24° to 30°, and a module m, a number of teeth z, a tooth depth h and a helix angle $\beta$ selected based on the pressure angle $\alpha$ and the stroke ratio so as to satisfy a predetermined design condition, from the following respective ranges:

module m: 1.8 to 2.0
number of teeth z: 7 to 13
tooth depth h: 2 m to 2.5 m
helix angle $\beta$: 35° or smaller According to the present invention, the pressure angle $\alpha$ of the pinion teeth provided on the pinion shaft is selected from the range of 24° to 30° which is sufficiently larger than the standard pressure angle, to reduce meshing friction under pressurization by the rack teeth, thus enabling smooth transmission. The upper limit of 30° of the pressure angle $\alpha$ is determined by processing restriction. Based on the pressure angle $\alpha$ and the stroke ratio thus selected, the module m and the number of teeth z are selected so as to satisfy geometrical requirements to secure a trochoid interference clearance and a tooth thickness of the addendum, as well as strength requirements to secure a bending strength of the dedendum and a fatigue strength of the tooth surface. At the same time, a tooth depth h is selected so as to reduce an addendum modification and slippage fluctuation at the mesh portion, and also a helix angle $\beta$ is selected so as to alleviate a load on a supporting bearing of the pinion shaft thus determining the tooth specifications, and enabling smooth and assured transmission to the rack shaft provided with the rack teeth meshed without backlash, thus achieving comfortable steering feeling.

A rack-and-pinion steering apparatus according to a second aspect of the present invention is characterized in that the pinion teeth according to the first aspect comprises a modified tooth surface subjected to a tooth surface modification such that a pressure angle error oriented so as to increase a mesh stress with the rack teeth is provided in a direction of the tooth profile, and that a central portion thereof is formed in a convex shape. Further, a rack-and-pinion steering apparatus according to a third aspect of the present invention is characterized in that the pinion teeth according to the first or the second aspect comprises a modified tooth surface subjected to a tooth surface modification of crowning along a tooth trace direction.

According to these inventions, the tooth surface modification including one or both of the correction of the pressure angle in a direction of the tooth profile and the crowning in the tooth trace direction is introduced, so as to improve the tooth bearing that causes fluctuation in torque during the steering operation, thereby improving the steering feeling and leveling off the abrasion of the tooth surface to compensate the degradation in strength of the pinion teeth.

A rack-and-pinion steering apparatus according to a fourth aspect of the present invention is characterized by comprising a motor for steering assistance disposed between the steering member and the pinion shaft, thus to constitute an electric power steering apparatus that transmits the rotational force of the motor to the pinion shaft to assist the steering operation executed according to the rotation of the pinion shaft.

According to this invention, the pinion teeth formed according to the foregoing tooth specifications are employed in the electric power steering apparatus, in which both the operating force applied to the steering member by the driver and the force generated by the motor are applied to the mesh portion between the pinion teeth and the rack teeth, to thereby minimize the risk of breakdown of the teeth and to prevent degradation in response caused by the impact of the meshing friction, thus achieving comfortable steering feeling.

In the rack-and-pinion steering apparatus according to the present invention, properly selecting the tooth specifications of the pinion teeth provided on the pinion shaft enables the pinion teeth to mesh with the rack teeth provided on the rack shaft without backlash, under optimally minimized meshing friction and without incurring trochoid interference, thereby stably offering smooth and comfortable steering feeling over a long time. Thus, the present invention provides excellent benefits.

BRIEF DESCRIPTION OF THE DRAWINGS

FIG. 7 is a graph showing a result of examination on the effect of the tooth surface modification.

Figure 1:
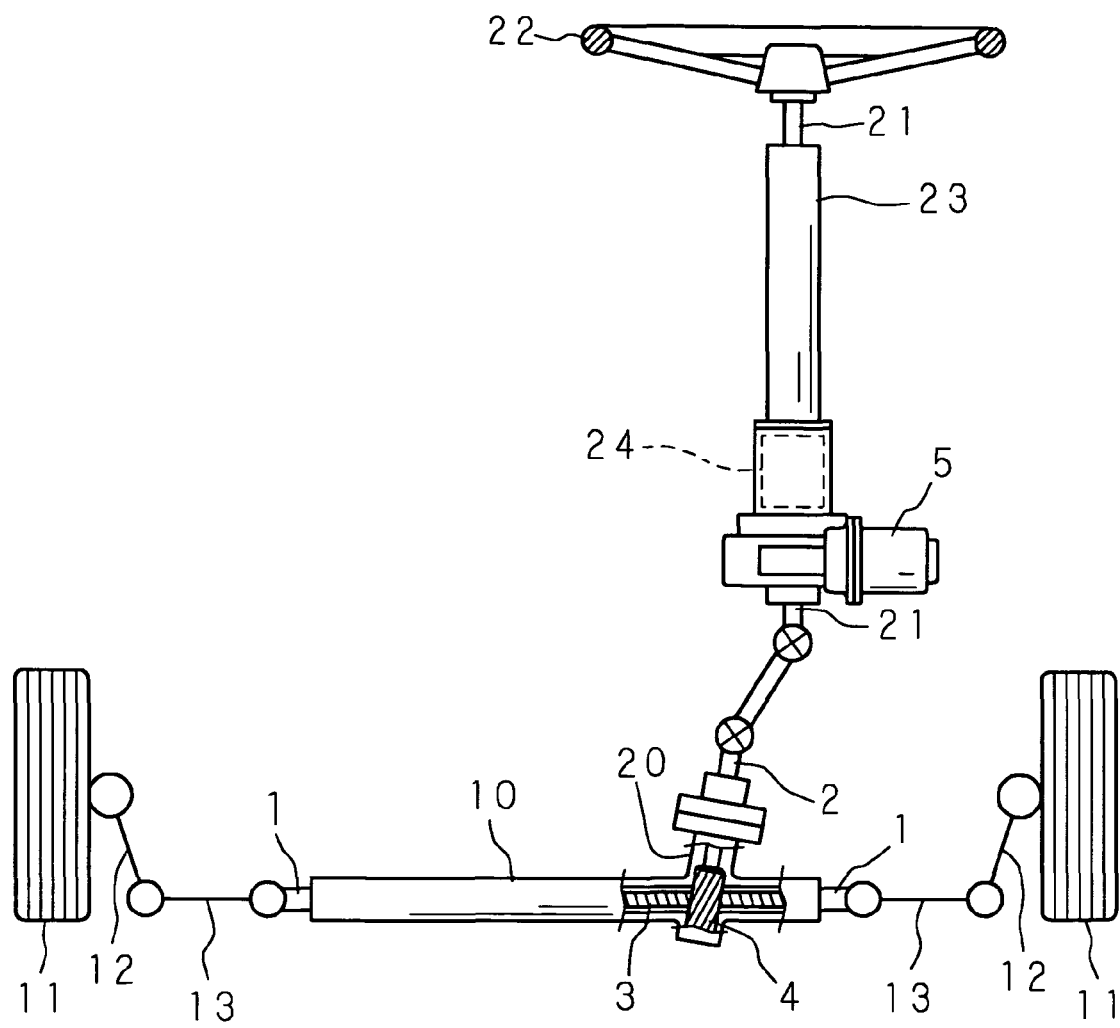
FIG. 1 is a schematic drawing showing an overall structure of a rack-and-pinion steering apparatus according to the present invention.

EXPLANATION OF CODES 1 rack shaft
2 pinion shaft
3 rack tooth
4 pinion tooth
5 motor
22 steering wheel (steering member)
$\alpha$ pressure angle
$\beta$ helix angle
m module
z number of teeth

BEST MODE FOR CARRYING OUT THE INVENTION

Hereunder, the present invention will be described in details, referring to the accompanying drawings showing the embodiments thereof. FIG. 1 is a schematic drawing showing an overall structure of a rack-and-pinion steering apparatus according to the present invention. In FIG. 1, numeral 1 designates a rack shaft, and the rack shaft 1 is movably supported in an axial direction thereof inside a cylindrical rack housing 10, so as to extend in a left and right direction of a vehicle body, which is not shown. The respective ends of the rack shaft 1 projecting from both sides of the rack housing 10 are connected to knuckle arms 12, 12 of the left and right front wheels 11, 11, serving as the wheels for steering, via respective tie rods 13, 13.

To a portion of the rack housing 10 close to a lateral end thereof, a pinion housing 20 is connected such that the central axes intersect with each other, and inside the pinion housing 20 a pinion shaft 2 is pivotably supported around its axis. A portion of the pinion shaft 2 projects upward from the pinion housing 20 by an appropriate length, and the tip of the projecting portion is connected to a steering wheel 22, corresponding to the steering member, via a column shaft 21.

A lower portion of the pinion shaft 2 extending inside the pinion housing 20 includes a larger-diameter portion over an appropriate length, and pinion teeth 4 are provided on an outer circumferential surface of the larger-diameter portion. The rack shaft 1 supported inside the rack housing 10 is provided with rack teeth 3 formed over an appropriate length including a portion opposing the pinion shaft 2, and the rack teeth 3 are meshed with the pinion teeth 4 provided on the circumferential surface of the pinion shaft 2.

Under such structure, when the steering wheel 22 is rotated for steering purpose, the pinion shaft 2 connected to the steering wheel 22 via the column shaft 21 is caused to rotate, and the rotation is converted into an axial movement of the rack shaft 1 at the mesh portion between the pinion teeth 4 and the rack teeth 3, so that the rack shaft 1 moves in both left and right directions.

Such movement of the rack shaft 1 is transmitted to the left and right knuckle arms 12, 12 via the tie rods 13, 13 connected to the respective ends of the rack shaft 1, so that the knuckle arms 12, 12 push or pull the left and right front wheels 11, 11 so as to steer these wheels in the manipulating direction of the steering wheel 22, by an angle corresponding to the amount of the manipulation.

The rack-and-pinion steering apparatus shown in FIG. 1 is constituted as an electric power steering apparatus including a motor 5 that assists the steering operation executed as above. The motor 5 for steering assistance is mounted substantially orthogonally to the column shaft 21, on an outer periphery of a portion close to the lower end of a cylindrical column housing 23 supporting the column shaft 21, and connected to a worm gear reduction apparatus (not shown) disposed inside the column housing 23, so that the rotation of the motor 5 for steering assistance is transmitted to the column shaft 21 through speed reduction by the worm gear reduction apparatus.

Inside the column housing 23, a torque detecting unit 24 that detects the rotating torque (steering torque) applied to the column shaft 21 is disposed at an upper position from the mounting position of the motor 5, and the steering torque detected by the torque detecting unit 24 is utilized for drive control of the motor 5 for steering assistance.

Under such structure, when the steering wheel 22 is rotated for steering purpose, the steering torque applied to the column shaft 21 is detected by the torque detecting unit 24, and the rotational force of the motor 5 controlled based on the detected torque is applied to the column shaft 21, and then transmitted from the column shaft 21 to the pinion shaft 2, so that an axial moving force is applied to the rack shaft 1, for assisting the steering operation executed as above.

The feature of the rack-and-pinion steering apparatus according to the present invention lies, as described above, in the configuration of the pinion teeth 4 provided on the pinion shaft 2 which rotates with the manipulating force of the steering wheel 22 and the rotational force of the motor 5 applied thereto.

Figure 2:
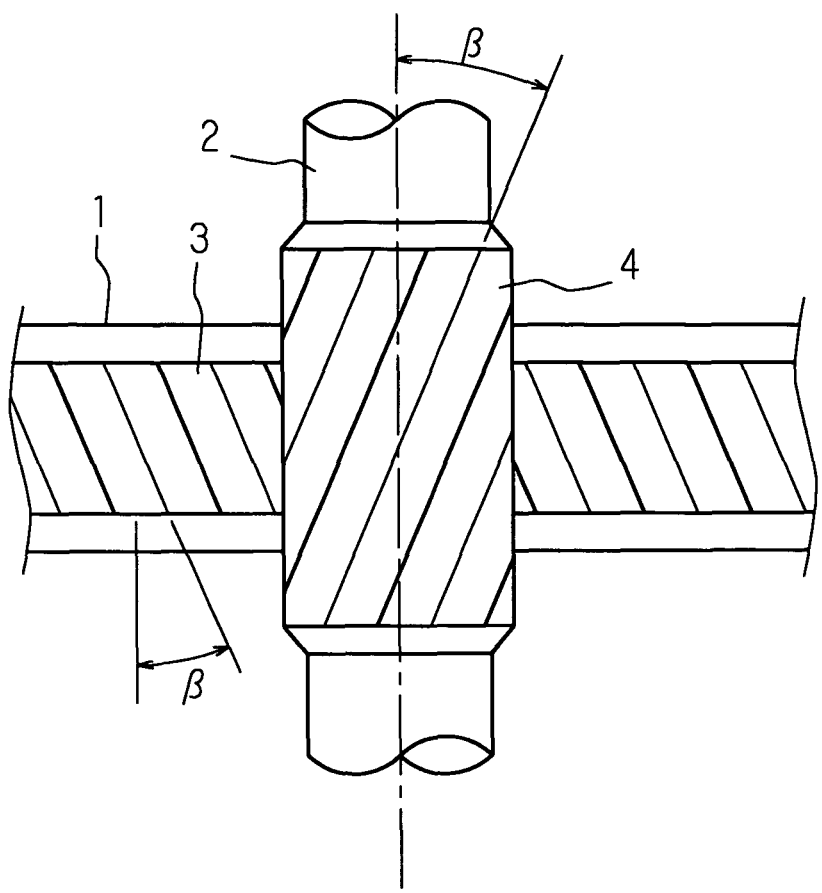
FIG. 2 is an enlarged view showing a portion around an intersection of a rack shaft and a pinion shaft.

FIG. 2 is an enlarged view showing a portion around the intersection of the rack shaft 1 and the pinion shaft 2. As schematically shown in FIG. 2, the pinion teeth 4 provided on the pinion shaft 2 are formed as helical teeth having a predetermined helix angle $\beta$ with respect to the axial centerline of the pinion shaft 2. The rack teeth 3 provided on the rack shaft 1 are formed as skewed teeth inclined by an angle corresponding to the helix angle $\beta$ with respect to a direction orthogonal to the axial direction of the rack shaft 1, and meshed with the pinion teeth 4 at the intersection with the pinion shaft 2.

Figure 3:
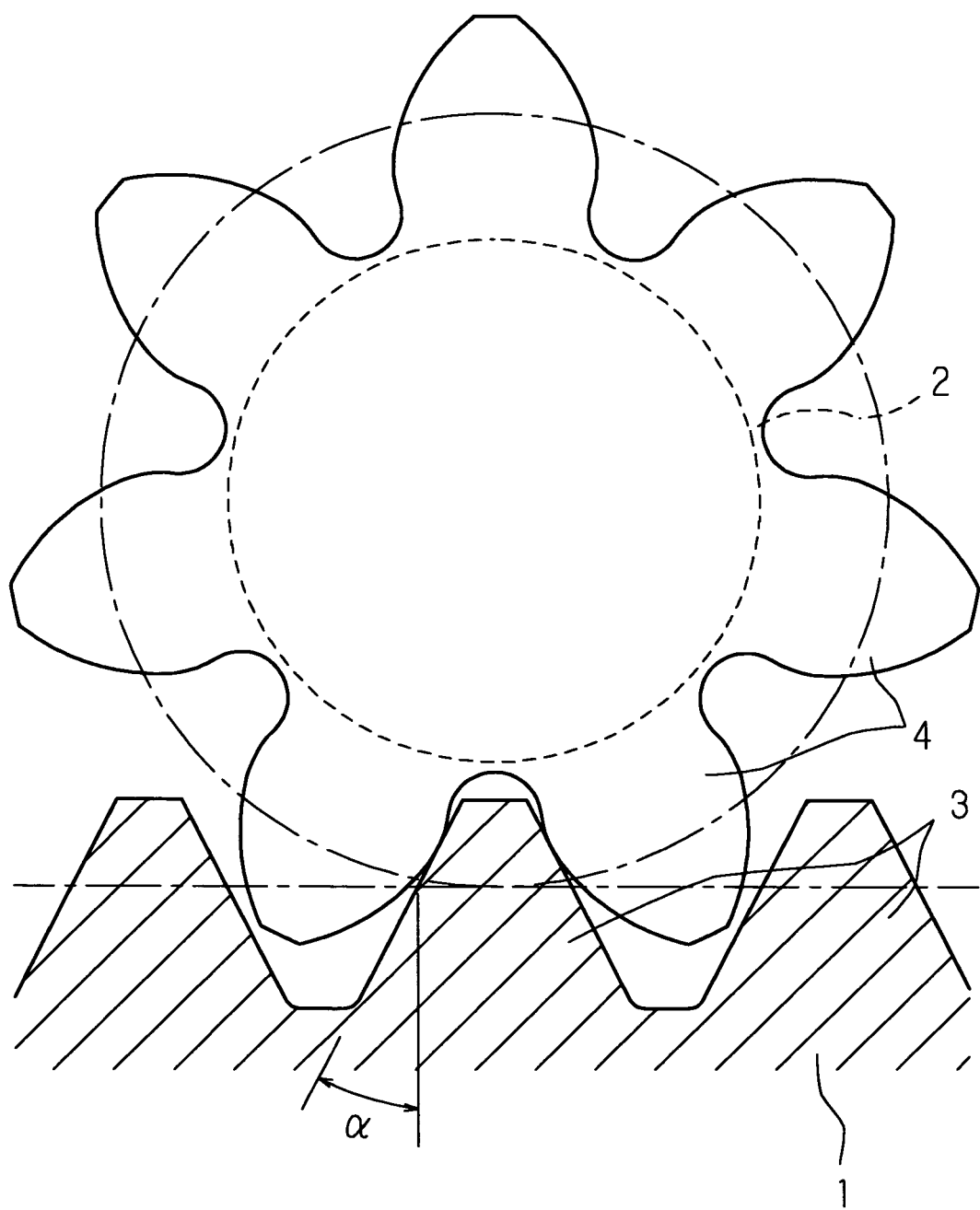
FIG. 3 is a horizontal cross-sectional view showing a mesh portion between rack teeth and pinion teeth.

FIG. 3 is a horizontal cross-sectional view showing a mesh portion between the rack teeth 3 and the pinion teeth 4. The rack teeth 3 has, as shown in FIG. 3, a pressure angle $\alpha$, i.e. an angle $\alpha$ of the tooth surface with respect to the tooth profile direction, and the pressure angle of the pinion teeth 4 meshed with the rack teeth 3 is also $\alpha$.

Here, the rack shaft 1 is biased with pressure toward the pinion shaft 2 by known pressurizing means that utilizes a spring load, so that the rack teeth 3 and the pinion teeth 4 are meshed without backlash, as shown in FIG. 3. This can reduce a rattling noise produced by collision of the rack teeth 3 and the pinion teeth 4 at the mesh portion thereof, for example upon switching the steering direction by reverse manipulation of the steering wheel 22, or when a reverse input from the rack shaft 1 is applied.

On the other hand, meshing the rack teeth 3 and the pinion teeth 4 without backlash creates large meshing friction, and the influence of the meshing friction propagates to the steering wheel 22 connected to the pinion shaft 2 via the column shaft 21, and is perceived by the driver manipulating the steering wheel 22 thus degrading the steering feeling.

For reducing the meshing friction to obtain comfortable steering feeling, it is effective to increase the pressure angle $\alpha$ of the pinion teeth 4 (and rack teeth 3), to thereby weaken the wedge effect between the rack teeth 3 and the pinion teeth 4 meshed without backlash. However, pressure angle $\alpha$ has an upper limit because of processability restriction, and it is difficult to form a pressure angle $\alpha$ exceeding 30°. In the rack-and-pinion steering apparatus according to the present invention, it is an object to optimally minimize the meshing friction free from the processability restriction, and accordingly the pressure angle $\alpha$ of the pinion teeth 4 is selected out of a range of 24° to 30°, which is sufficiently larger than the standard pressure angle stipulated in JIS.

Also, with respect to the rack-and-pinion steering apparatus, a stroke ratio S representing a travel amount of the rack shaft 1 per rotation of the pinion shaft 2 is specified, as a requirement from the vehicle on which the steering apparatus is incorporated. The stroke ratio S is given from a range of 35 to 60 mm, in ordinary vehicles.

Other tooth specifications of the pinion teeth 4, namely the module m, the number of teeth z, the tooth depth h and the helix angle $\beta$ are selected through the following steps based on the above pressure angle $\alpha$ and the stroke ratio S, out the respective ranges thereof.

Figure 4:
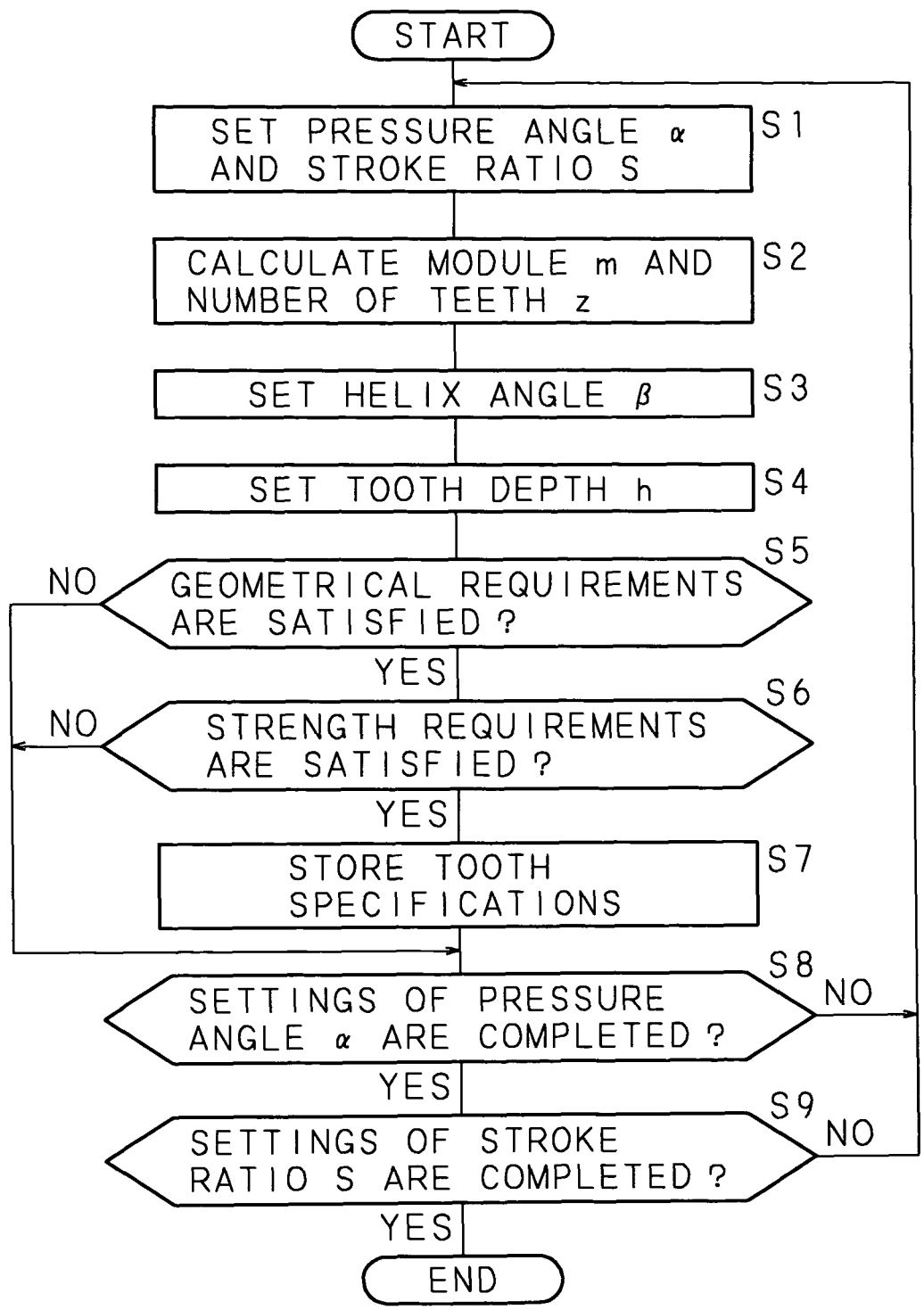
FIG. 4 is a flowchart showing selection procedure of tooth specifications of the pinion teeth.

FIG. 4 is a flowchart showing the selection procedure of the tooth specifications of the pinion teeth 4. For the selection, firstly the pressure angle $\alpha$ and the stroke ratio S are set (step 1).

With respect to the pressure angle $\alpha$, the employable angle is restricted depending on the tooth cutting tool. Accordingly, for example, the foregoing lower limit of 24° is set as the initial value, and the following steps are carried out under different set values at a pitch determined by the restriction of the tool, up to the upper limit of 30°. Regarding the stroke ratio S, although in an actual designing job this is a fixed value provided by the vehicle on which the steering apparatus is mounted as design requirements, herein the following steps are carried out under gradually varying set values of the stroke ratio S between the lower limit of 35 mm and the upper limit of 60 mm, for determining an appropriate range of the module m and the number of teeth z.

Upon setting the pressure angle α and the stroke ratio S as above, the module m and the number of teeth z of the pinion teeth 4 are calculated based on those set values (step 2). The calculation is performed through a known method based on peripheral dimensions such as the outer diameter of the pinion shaft 2 on which the pinion teeth 4 are provided and the center distance between the pinion shaft 2 and the rack shaft 1, and the pressure angle α and the stroke ratio S, such that the module m and the number of teeth z are specified in combinations of a plurality of numbers of teeth z that are only integers, and the corresponding module m.

Then a plurality of helix angle values β of the pinion teeth 4 is set within a range under a predetermined upper limit angle (step 3), and a plurality tooth depth values h is set within a predetermined range including the module m (step 4).

The upper limit angle of the helix angle β, which is determined by the thrust load capacity of the bearing supporting the pinion shaft 2 provided with the pinion teeth 4 inside the pinion housing 20, is usually set at around 40°. On the other hand, although in an actual designing job the helix angle β is determined in a range of 30° to 35° which is close to the upper limit, because when the helix angle β is smaller, the length of the path of contact along the tooth trace direction between the pinion teeth 4 and the rack teeth 3 becomes short, which makes it difficult to satisfy the strength condition to be subsequently described, herein the helix angle β is set over the entire range from the upper limit angle of 40° to the lower limit angle of 0°, in order to determine an appropriate range of the module m and the number of teeth z, for executing the following steps.

The tooth depth h is set within a range of 2 m to 2.5 m (m designates the module). Such range is determined in order to secure a tooth depth of around 1 module on an addendum side to form a tooth profile close to a full depth tooth (h=2.25 m), and to secure a transverse contact ratio of 1 or greater at the mesh portion between the pinion teeth 4 and the rack teeth 3, thus minimizing occurrence of discontinuous meshing.

Then it is decided whether each of the tooth specifications determined by sequentially combining the plurality of helix angle values β and the tooth depth values h set at the steps 3 and 4 with the module m and the number of teeth z calculated at the step 2 satisfies predetermined geometrical requirements (step 5), and also predetermined strength requirements (step 6), and only those tooth specifications that satisfy the both requirements are stored (step 7). Then it is decided whether the pressure angle α and the stroke ratio S have been set over the entire range (step 8, 9), and in the case where the setting is not completed, the process returns to the step 1, to resume the setting of the pressure angle α and the stroke ratio S, and to repeat the same steps.

One of the geometrical requirements serving as the criterion at the step 5 is whether the pinion teeth 4 and the rack teeth 3 can be meshed without interference, and another is whether the addendum of the pinion teeth 4 is provided with a sufficient tooth thickness. The former, i.e. the meshing status is judged for example based on whether a trochoid interference clearance of 0.3 mm or more is secured upon calculation by the following equation.

$$t = \sqrt{(100AB)^2 + \left[(AC + mX)\sin\left\{\cos^{-1}\frac{B}{1 + 2X\cos\beta/C}\right\}\right]^2} \quad (1)$$
$$-(100A + m) > 0$$

$$\begin{cases} A = m/2\cos\beta \\ B = \cos\{\tan^{-1}(\tan\alpha/\cos\beta)\} \\ C = 100 + z \end{cases}$$

In the equation, X designates an addendum modification coefficient, given as a value obtained by dividing the addendum modification specified for the pinion teeth 4 with the module m. Also, t stands for the trochoid interference clearance, serving as the index indicating whether a phenomenon that the tooth tip of a rack tooth 3 that has passed the predetermined meshing position interferes with the dedendum of a pinion tooth 4 as if gouging out the same under the meshing status of the rack teeth 3 and the pinion teeth 4 as shown in FIG. 3, i.e. what is known as trochoid interference, takes place.

Figure 5:
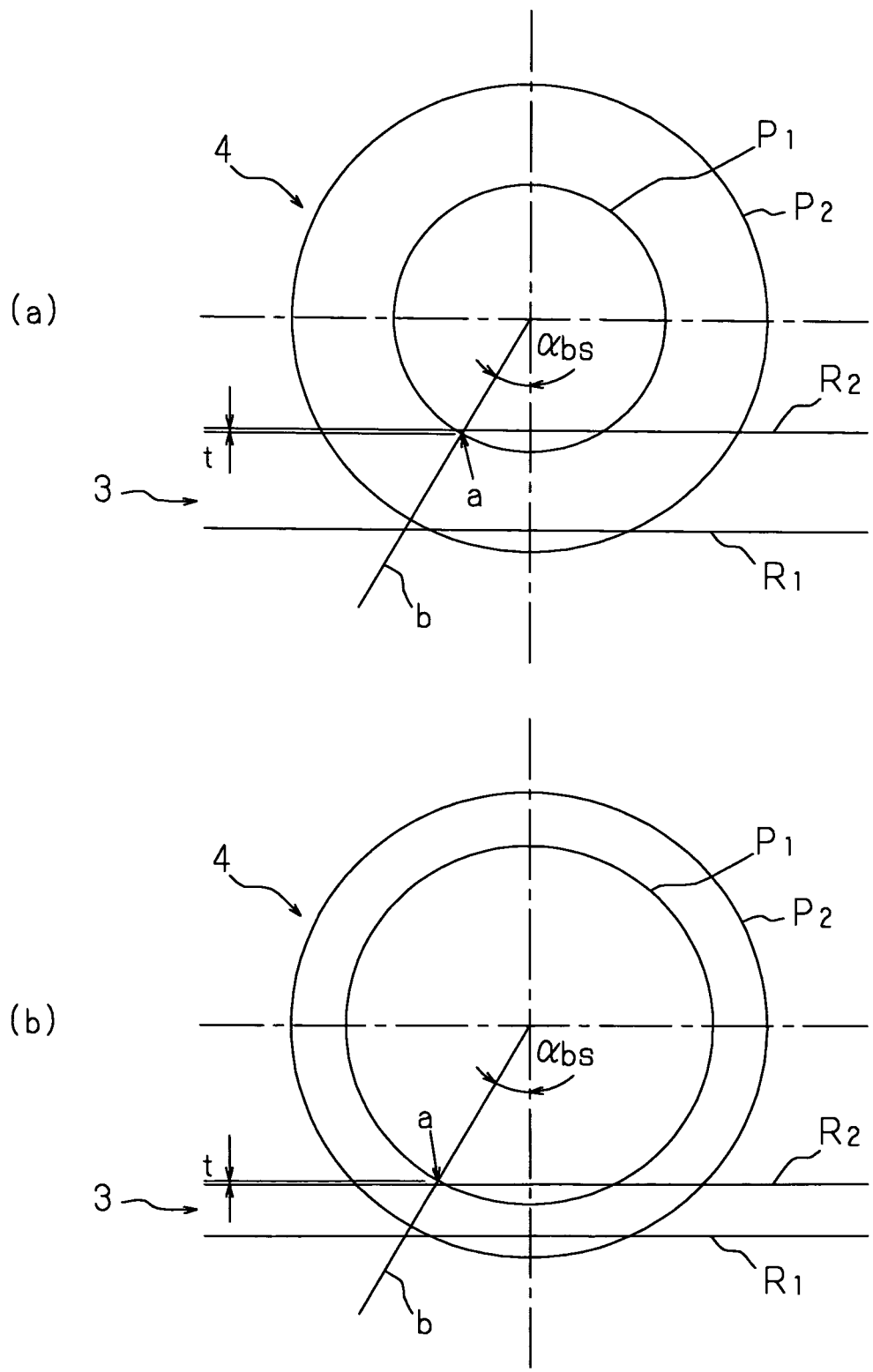
FIGS. 5(*a*) and 5(*b*) are diagrams for explaining a trochoid interference clearance.

FIGS. 5(a) and 5(b) are diagrams for explaining the trochoid interference clearance. In FIGS. 5(a) and 5(b), $P_1$ designates a base circle of the pinion teeth 4, and $P_2$ designates an addendum circle of the pinion teeth 4. $R_1$ designates a base circle of the rack teeth 3, and $R_2$ designates an addendum circle of the rack teeth 3. Also, in FIGS. 5(a) and 5(b), $\alpha_{bs}$ stands for a working pressure angle, and the working pressure angle $\alpha_{bs}$ at the mesh portion between the rack teeth 3 and the pinion teeth 4 is equal to the pressure angle α of the rack teeth 3 and the pinion teeth 4.

FIG. 5(a) depicts a case where a difference in diameter between the base circle $P_1$ and the addendum circle $P_2$ of the pinion teeth 4 is large, and FIG. 5(b) depicts a case where the difference in diameter is small. The trochoid interference clearance t is given as a distance between a point a where a contact line b inclined by the working pressure angle $\alpha_{bs}$ toward a side of the contact center line intersects with the base circle $P_1$ of the pinion teeth 4 and the addendum circle $R_2$ of the rack teeth 3.

Here, under the condition that the working pressure angle $\alpha_{bs}$ is identical, the intersection point a in FIG. 5(a) is located at an inner position (on the dedendum side) from the addendum circle $R_2$ of the rack teeth 3, the intersection point a in FIG. 5(b) is located at an outer position from the addendum circle $R_2$ of the rack teeth 3, and therefore the trochoid interference between the rack teeth 3 and the pinion teeth 4 takes place under the state shown in FIG. 5(a).

The trochoid interference clearance t obtained by the equation (1) becomes negative under the state shown in FIG. 5(a) and becomes positive under the state shown in FIG. 5(b), according to the geometrical positional relation between the rack teeth 3 and the pinion teeth 4 shown in FIGS. 5(a) and 5(b), and at the step 5 the pressure angle α, the helix angle β, the module m and the number of teeth z, which are set as above, are substituted in the equation (1) to sequentially calculate the trochoid interference clearance t, to thereby decide that the meshing may be executed provided that the calculated value turns out to be 0.3 mm or more, as already stated. A purpose of setting the lower limit of the trochoid interference clearance t at 0.3 mm is to eliminate an influence of a processing error of the pinion teeth 4 and the rack teeth 3, and also an influence of distortion that emerges on the pinion teeth 4 or the rack teeth 3, during the foregoing operation.

Now the latter condition, i.e. whether the tooth thickness of the addendum is acceptable, is provided for preventing excessive hardening in a heat treatment after a teeth cutting process, and may be decided, for example, depending on whether the tooth thickness (in a direction perpendicular to the tooth profile) $s_{kn}$ of the addendum of the pinion teeth 4 calculated by the following equations is 0.3 m (m designates the module), which is employed as a threshold value in the designing of force transmitting gears.

$$s_k = r_k \left\{ \frac{\pi + 4x\tan\alpha}{z} - 2(inv\alpha_{ks} - inv\alpha_s) \right\} \tag{2}$$

$$s_{kn} = s_k \cos\beta_k \tag{3}$$

In the equations, $s_k$ designates a transverse tooth thickness of the pinion teeth 4; $r_k$ designates an addendum circle radius of the pinion teeth 4; and $\beta_k$ designates a helix angle of the pinion teeth 4 on the addendum circle. Also, $\alpha_{ks}$ stands for a gear rotation angle corresponding to the tooth tip position, and $\alpha_s$ designates a pressure angle on the standard pitch circle, which can be obtained through the following equations.

$$\alpha_{kn} = \cos^{-1}\left(\frac{r_g}{r_k}\right) \tag{4}$$

$$\alpha_s = \tan^{-1}\left(\frac{\tan\alpha}{\cos\beta}\right)$$

Here, $r_g$ designates a base circle radius of the pinion teeth 4. At the step 5, the pressure angle $\alpha$, the number of teeth z and the helix angle $\beta$, which are set as above, are substituted in the equations (2), (3), and (4) to sequentially calculate the tooth thickness (in a direction perpendicular to the tooth profile) $s_{kn}$ of the addendum of the pinion teeth 4, to thereby decide that the tooth thickness of the addendum is acceptable provided that the calculated value turns out to be 0.3 m or more, as already stated. It is to be noted that when the tooth thickness of the addendum of the pinion teeth 4 appears likely to wear, it is desirable to adopt a carburizing and quenching in the heat treatment, to apply full topping to the addendum to remove acute-angle portions, and to avoid excessive hardening (overheating) in the heat treatment process.

At the step 6, one of the strength requirements serving as the criterion for the decision is the bending strength of the dedendum of the pinion teeth 4, and another is the fatigue strength of the tooth surface. The bending strength of the dedendum is evaluated with the following equation (Lewis equation) employed for calculation of bending stress of $\sigma_B$ of a spur gear.

$$\sigma_B = \frac{F_N h_F \cos\omega}{\frac{s_F^2 b}{6}} \tag{5}$$

In this equation, $F_N$ designates a tooth surface normal load, given as a designing condition from the vehicle on which the rack-and-pinion steering apparatus is to be mounted. Also, $\omega$ in the equation represents a complementary angle of an angle defined by the load line and the tooth profile center line; $h_F$ represents a distance from the intersection point of the load line and the tooth profile center line to the critical section; and $s_F$ represents a tooth thickness of the critical section, which can be obtained by the following equations, when the pinion teeth 4 are skewed teeth.

$$\omega = \sqrt{\left(\frac{mz+2h_0}{mz\cos\alpha_0}\right)^2 - 1} - \left(\frac{\pi + 4x\tan\alpha_0}{2z} + inv\alpha_0\right) \tag{6}$$

$$h_F = \frac{mz}{2}\left[\frac{\cos\alpha_0}{\cos\omega} - \sin\left(\theta + \frac{\pi}{6}\right)\right] + \left[\frac{h_a - \rho_0 - mx}{\cos\theta} + \rho_0\right]\sin\frac{\pi}{6} \tag{7}$$

$$s_F = mz\cos\left(\theta + \frac{\pi}{6}\right) - 2\left[\frac{h_a - \rho_0 - mx}{\cos\theta} + \rho_0\right]\cos\frac{\pi}{6} \tag{8}$$

Here, $\alpha_0$ in these equations represents a pressure angle of the tool; $\rho_0$ represents a radius of an addendum profile of the tool; $h_a$ represents the tooth depth of the addendum; and $\theta$ can be obtained from the following equations.

$$\theta = \frac{\pi}{2} - \left(\varphi + \gamma_0 + \frac{\pi}{6}\right) \tag{9}$$

$$\varphi = \sqrt{\left(\frac{1}{2} + \frac{h_a - \rho_0 - mx}{mz}\right)^2 \tan^2\left(\gamma_0 + \frac{\pi}{6}\right) + 2\frac{h_a - \rho_0 - mx}{mz}} \tag{10}$$

$$- \left(\frac{1}{2} + \frac{h_a - \rho_0 - mx}{mz}\right)\tan\left(\gamma_0 + \frac{\pi}{6}\right)$$

$$\gamma_0 = \frac{m\pi/2 + 2(h_a - \rho_0)\tan\alpha_0 + 2\rho_0\sec\alpha_0}{mz} \tag{11}$$

The fatigue strength of the tooth surface is evaluated based on the tooth surface contact stress $\sigma_H$ obtained by the following equation, applying the elastic contact theory of Hertz.

$$\sigma_H = \sqrt{0.35 \cdot E \cdot P_n\left(\frac{z_1 + z_2}{z_2}\right)\frac{\cos^2\beta_g}{N_b \cdot \varepsilon_s \cdot b \cdot d_b \cdot \sin\alpha_{bs}}} \tag{12}$$

In this equation, E designates a longitudinal modulus of elasticity of the gear material; $z_1$ designates the number of teeth of the smaller gear; $Z_2$ designates the number of teeth of the larger gear; $\beta_g$ represents a cylindrical helix angle of the base circle; $N_b$ represents effectiveness of a face width of the tooth; $\varepsilon_s$ represents a transverse contact ratio; b represents a face width perpendicular to the shaft; and $\alpha_{bs}$ represents a transverse working pressure angle. Also, $P_n$ represents a tangent load perpendicular to the tooth and $d_b$ represents a working pitch circle diameter of the smaller gear, each of which can be obtained from the following equations.

$$F_b = P_n \cos\beta_g \cos\alpha_s \tag{13}$$

$$d_b = \frac{m_n z_1}{\cos\beta_0} \tag{14}$$

At the step 6, with respect to the pinion teeth 4 for which the pressure angle $\alpha$, the number of teeth z and the helix angle $\beta$ have been set, it is decided that the strength requirements are satisfied, provided that the bending stress $\sigma_B$ calculated by the equation (5) and the tooth surface contact stress $\sigma_H$ calculated by the equation (12) do not exceed the allowable stress of the gear material.

Through the foregoing steps, the tooth specifications for the pinion teeth 4 that enable smooth meshing and provides a sufficient bending strength and fatigue strength can be determined, with a pressure angle $\alpha$ within a range of 24° to 30° and an ordinary stroke ratio S within a range of 35 to 60 mm, and such tooth specifications can be defined as follows:

module m: 1.8 to 2.0
number of teeth z: 7 to 13
tooth depth h: 2 m to 2.5 m
helix angle $\beta$: 35° or smaller For example, when the pressure angle $\alpha$ is 27°, upon setting the helix angle $\beta$ at 33° under a usual designing condition that the stroke ratio S is 40 mm/rev., the optimum tooth specifications for the pinion teeth 4 are determined as 1.8 mm for the module m, and 7 for the number of teeth z, as shown in FIG. 3.

Here, the general tooth specifications conventionally adopted under the foregoing designing conditions are: the pressure angle $\alpha$=14.5°, the module m=2.5, the number of teeth z=5. In the tooth specifications according to the present invention, the module m is smaller but the number of teeth z is greater, and thus a larger number of small-sized pinion teeth 4 are provided.

As a result of an experiment of measuring a rotating torque needed to rotate the pinion shaft 2 without applying any load to the rack shaft 1, with the rack-and-pinion steering apparatus according to the present invention configured under the foregoing tooth specifications for the pinion teeth 4, the necessary rotating torque has turned out to be 0.4 Nm, while the conventional rack-and-pinion steering apparatus configured under the standard tooth specifications has proved to require a rotating torque of 1.2 Nm, through the same experiment.

The rotating torque stands for the meshing friction between the rack teeth 3 and the pinion teeth 4, and hence it is obvious that the rack-and-pinion steering apparatus according to the present invention can significantly reduce the meshing friction, even taking into account some error in condition setting for the experiments, thereby allowing a reaction force from the road surface to propagate directly to the driver manipulating the steering wheel 22 thereby achieving, for example, improvement in steering feeling when driving at a high speed on a low-$\mu$ road that provides only a small reaction force from the road surface.

Also, although adopting the foregoing tooth specifications for the rack-and-pinion steering apparatus according to the present invention may lead to lowered strength of the dedendum of the pinion teeth 4 by employing the foregoing tooth specifications, such lowering of strength is compensated by employing a larger pressure angle $\alpha$, which increases the face width of the dedendum, and besides an increase in the number of teeth z leads to an increase in transverse contact ratio, and therefore the lowering of dedendum strength is hardly an issue when compared with the steering apparatus according to the standard tooth specifications, and moreover the steering apparatus of the present invention has proved to have sufficient durability through a durability test of the power steering apparatus in which the manipulating force of the steering wheel 22 and the rotational force of the motor 5 is imposed already described.

Figure 6:
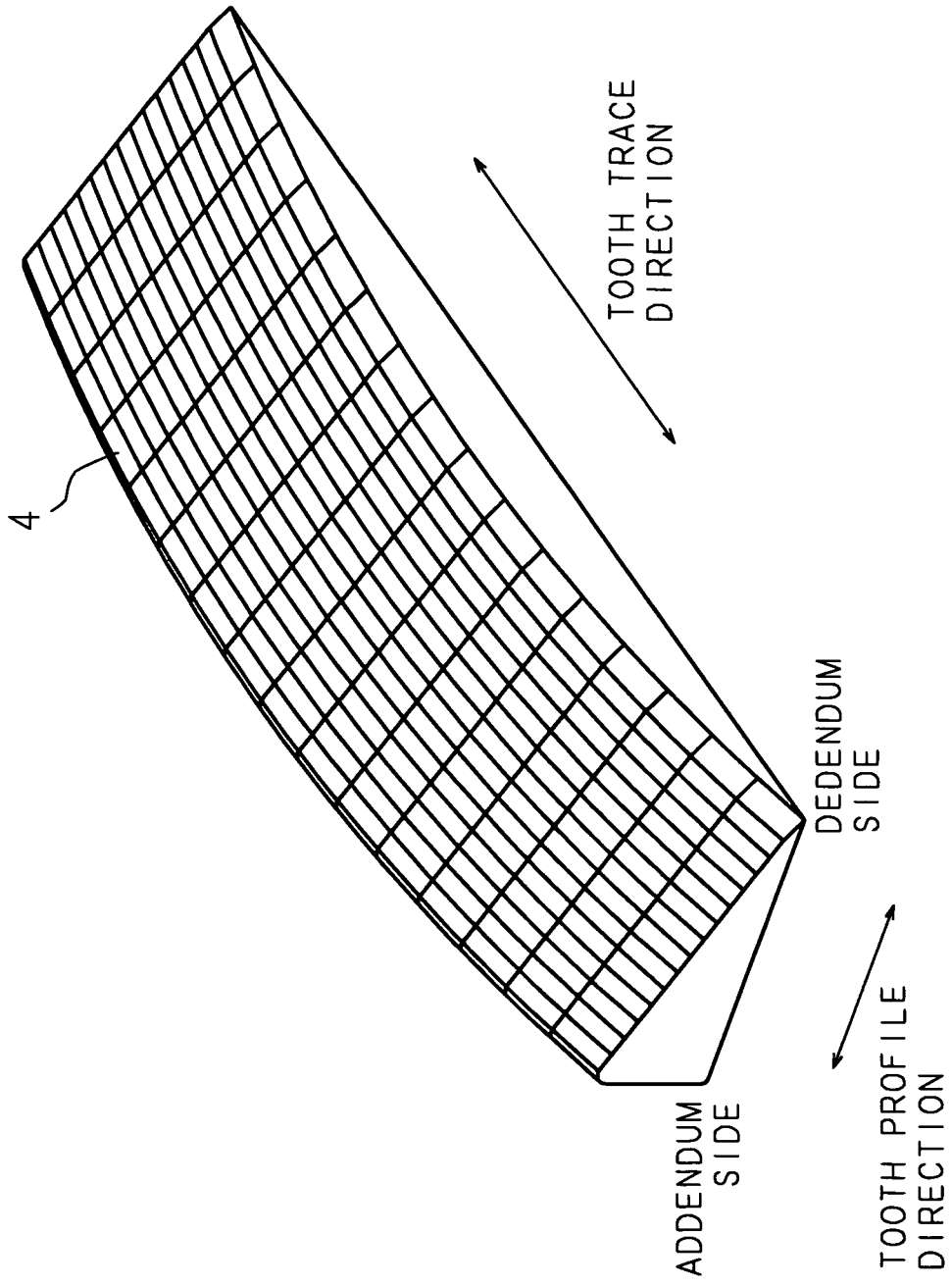
FIG. 6 is a schematic drawing for explaining desirable tooth surface modification.

For compensating the lowering of the dedendum strength, it is preferable to additionally introduce tooth surface modification as described here below. FIG. 6 is a schematic drawing for explaining desirable tooth surface modification. FIG. 6 depicts the tooth surface of the pinion teeth 4 divided in a mesh pattern in vertical and horizontal directions. To the tooth surface, a negative pressure angle error is set in a direction of the tooth profile, such that the pressure angle of the addendum is made larger than the pressure angle of the dedendum, i.e. the pressure angle error in such a direction that increases the mesh stress with the rack teeth 3, and besides such tooth surface modification is applied as forming a central portion thereof in a convex shape, and crowning along a direction of the tooth trace.

Such tooth surface modification enables leveling off distribution of the contact stress on the surface of the pinion teeth 4 in a direction of the tooth trace as well as in a direction of the tooth profile, thereby preventing uneven abrasion of the tooth surface thus to compensate the shortage in strength of the dedendum, which results in improved durability. It is to be noted that in the pinion teeth 4 according to the foregoing tooth specifications, an appropriate amount of the crowning is approximately 10 $\mu$m at maximum at a central portion, and an appropriate error of the tooth thickness is approximately 20 $\mu$m at maximum at the addendum.

FIG. 7 is a graph showing a result of measurement of abrasion loss of the surface of the pinion teeth 4 after executing the predetermined durability test, carried out for examining the effect of the tooth surface modification. White bars in FIG. 7 represent the result obtained after the foregoing tooth surface modification; hatched bars in FIG. 7 represent the result obtained without the tooth surface modification respectively; and cross-hatched bars in FIG. 7 represent the result obtained after the tooth surface modification only including the crowning in the direction of the tooth trace.

Three bar groups on the left side in FIG. 7 indicate the abrasion loss distribution in the direction of the tooth trace in the vicinity of the base circle, and the measured values with respect to the vicinity of the line of tooth bearing on the tip portion side of the pinion shaft 2, the vicinity of the central portion of the pinion shaft 2 in the direction of the tooth trace, and the vicinity of the line of tooth bearing on the base portion side of the pinion shaft 2, in order from the left respectively. From these indications, it is apparent that although the total amount of the abrasion loss after performing only the crowning is similar to the case without the tooth surface modification, the abrasion loss is uniformly distributed in the direction of the tooth trace, which proves that executing the foregoing tooth surface modification results in significant reduction of the abrasion loss on an entire region in the direction of the tooth trace, with the uniformalizing effect by the crowning maintained unchanged.

Two bar groups on the right side in FIG. 7 indicate the abrasion loss distribution in the direction of the tooth profile, such that the left group represents the measured value with respect to the vicinity of the addendum, while the right group represents the measured value with respect to a substantially central portion in the direction of the tooth profile. These indications prove that executing the foregoing tooth surface modification enables significantly reducing the abrasion loss in the direction of the tooth profile, with the uniformalizing effect by the crowning maintained unchanged.

Although in the foregoing embodiment a negative pressure angle error is granted, i.e. the pressure angle of the addendum is made larger than the pressure angle of the dedendum, for providing the pressure angle error oriented so as to increase the mesh stress in the direction of the tooth profile between the rack teeth 3 and the pinion teeth 4, granting a positive pressure angle error, i.e. making the pressure angle of the dedendum larger than the pressure angle of the addendum can also increase the mesh stress.

Also, although the forgoing embodiment refers to application of the rack-and-pinion steering apparatus to the electric power steering apparatus including the motor for steering assistance between the steering member and the pinion shaft, so as to transmit the rotational force of the motor to the pinion shaft thus to assist the steering operation performed based on the rotation of the pinion shaft, i.e. what is known as a column assist type electric power steering apparatus, the rack-and-pinion steering apparatus according to the present invention may be structured as a different type electric power steering apparatus, or as a manual steering apparatus that executes the steering operation only with the steering torque applied by the driver via the steering wheel 22 serving as the steering member, and further as a hydraulic power steering apparatus that applies to the rack shaft 1 a force generated by a hydraulic cylinder disposed halfway of the rack housing 10, thus to assist the steering operation.

The invention claimed is:

1. A rack-and-pinion steering apparatus including pinion teeth provided on a circumferential surface of a pinion shaft and rack teeth provided on an outer surface of a rack shaft, meshed with each other substantially without backlash, so as to transmit rotation of the pinion shaft connected to a steering member to the rack shaft via a mesh portion between the pinion teeth and the rack teeth, thus to move the rack shaft in an axial direction thereof at a predetermined stroke ratio for execution of steering operation, wherein the pinion teeth are provided with a module m, a number of teeth z, a tooth depth h and a helix angle $\beta$ that remain within the following respective ranges, while satisfying a pressure angle $\alpha$ being within a range of 24° to 30° and the stroke ratio:

module m: 1.8 to 2.0, number of teeth z: 7 to 13, tooth depth h: 2 m to 2.5 m, and helix angle $\beta$: 40° or smaller, and wherein a trochoid interference clearance of the rack teeth and pinion teeth is positive.

2. The rack-and-pinion steering apparatus according to claim 1, wherein the pinion teeth are subjected to a tooth surface modification such that a difference in pressure angle is provided in a direction of the tooth profile so as to increase a mesh stress with the rack teeth, and that a central portion thereof is formed in a convex shape.

3. The rack-and-pinion steering apparatus according to claim 1, wherein the pinion teeth are subjected to a tooth surface modification of crowning along a tooth trace direction.

4. The rack-and-pinion steering apparatus according to claim 1, wherein a motor for steering assistance is disposed between the steering member and the pinion shaft, thus to constitute an electric power steering apparatus that transmits the rotational force of the motor to the pinion shaft to assist the steering operation executed according to the rotation of the pinion shaft.

5. The rack-and-pinion steering apparatus according to claim 1, wherein the trochoid interference clearance is 0.3 mm or more.

* * * * *